UNITED STATES PATENT OFFICE 2,089,063

GOLD SIZE

George P. Johnson, Newark, N. J., assignor to Rademaekers Marvel Size Co., Newark, N. J., a corporation of New Jersey No Drawing. Application April 30, 1937,
Serial No. 139,951

7 Claims. (Cl. 134—20)

This invention relates to sizing compounds such as gold size.

In applying lettering of gold and silver foil to the backs of books and the like, considerable difficulty is encountered in the adhesive quality of the sizing heretofore known. The backs of books are generally provided with fabrics impregnated with varnish, pyroxylin, lacquer, etc., to render the fabrics nonporous and to increase the wear resisting qualities thereof. A size or adhesive which would secure the foil to such fabrics permanently and without discoloration and which would be of general utility with the differently treated fabrics or any one of them has not been known in the art. In fact, it has been a source of great difficulty for many years in book bindery plants, the situation being that the operator had to lose time and expend energy and patience as a consequence, and considerable waste of the metal foil resulted.

It is therefore an object of the invention to provide a size or adhesive which shall be of substantially universal application in the securement of metal foil to nonporous impregnated or coated fabrics.

Another object of the invention is to provide such a size in liquid form, and which shall dry colorless and transparent, without undue hardness nor stickiness, and permit gold foil to be secured with a high degree of uniformity.

Another object of the invention is the provision of a size or adhesive which shall have substantially greater tenacity than those heretofore known.

Other objects of the invention will become apparent as the specification proceeds.

This is a continuation-in-part of my application Serial No. 120,691, filed January 15th, 1937.

I have described herein various ingredients and the proportions thereof by way of illustration and not in a limiting sense, and it will be evident to those skilled in the art that certain ingredients may be omitted, that substitutions may be made for certain of the ingredients, and that the proportions may be varied, all within the scope of the invention.

The essential base of my adhesive or size is egg albumen. Egg albumen, unless properly compounded, possesses a low power of penetration and can be rubbed off as a white powder when dry. The presence of egg albumen on a fabric tends to make the latter shiny, and, in general, egg albumen may have an undesirable effect on the clearness and appearance of any material to which it may be applied, particularly on those having a dull finish. When satisfactorily compounded as herein disclosed, egg albumen is adapted for suitable penetration and possesses very high tenacity, and the fabrics to which the compounded egg albumen is applied retain their actual finish. In fact, the size prepared according to the present invention will be transparent as well, a result heretofore unattainable to my knowledge.

If a solvent were used, such as would be sufficiently powerful to cause penetration of a waterproof fabric by egg albumen, the latter would ordinarily become burned or cooked by the solvent unless compounded according to my method hereinafter described.

To render egg albumen feasible for use according to the present invention and so as to avoid the difficulties mentioned, I may dissolve egg albumen in sufficient water and then gradually add thereto, with constant stirring, the powerful solvent or penetrating agent, the latter being preferably in diluted form. However, a solvent such as amyl acetate may be mixed in concentrated form with the egg albumen without the presence of water. Preferably I prefer to add a filler to the mixture of egg albumen and water, before adding the diluted penetrating agent. Such filler may be glucose, dextrose, grape sugar, fruit sugar, corn starch, flour, or fish glue, or equivalent.

Broadly the invention may be embodied in a mixture hereinafter designated as Formula A and including:

Formula A

Egg albumen
water, and a
penetrating agent

By the term penetrating agent is meant amyl acetate, ethyl acetate, acetone, ethyl alcohol or methyl alcohol, or the equivalent. Of these, the best for the intended result is amyl acetate. Amyl acetate and ethyl acetate are moderately water soluble so that if these solvents are used, the size is agitated before being applied. The other solvents are soluble in water, but water solubility of the solvents is immaterial to the size. The penetrating agent is thus an organic, volatile liquid that is relatively nonreactive with egg albumen in water solution or adapted to be nonreactive with egg albumen in water solution, and capable of dissolving or softening a coating of pyroxylin or a coating consisting of one of a group of pyroxylin, lacquer and varnish, or the like. The terms lacquer and varnish are used to denote those which are used for impregnating textile or other porous fabrics that are commonly externally employed in the book binding art, said fabrics being characterized in that the lacquers and varnishes thereof have dried relatively hard without undue tackiness so that these coated fabrics are adapted to take metal foil under heat and pressure according to the invention and to permit the excess of metal foil to be cleanly removed. The degree to which the coated fabric is moisture proof is immaterial in relation to the invention. Varnishes and lacquers are made, in general, according to secret formulae, and the above is believed to characterize those to which this invention has reference.

Egg albumen in crystalline or any other form may be used.

The water need not be pure and may or may not be associated with other constituents such as acetic acid, vinegar and the like. Both of the latter contain water.

Preferably I employ a size having an adhesive or filler therein, in addition to the egg albumen, to produce a base of greater density for the metal foil. It is not desirable to unduly increase the quantity of egg albumen because a portion thereof may become cooked by the penetrating agent, if the latter be other than amyl acetate, and because too much egg albumen will result in some discoloration of the size when applied, the egg albumen having a tendency of turning white, and being adapted to be readily removed in powder form when used in excess. Accordingly the invention may also be embodied in the following formula, hereinafter designated as Formula B:

*Formula B*

Egg albumen,
water,
a penetrating agent, and
a supplemental adhesive

By the term a supplemental adhesive is meant an adhesive other than egg albumen and which may illustratively consist of glucose, dextrose, grape sugar, fruit sugar, cooked corn starch, cooked flour or fish glue, or the equivalent. These will serve also as fillers supplemental to the egg albumen. They tend to mechanically combine with the egg albumen, increase its penetrability into the treated fabric, prevent the egg albumen from drying too hard when applied, so that the tendency of egg albumen to produce a white or gray or shiny discoloration is further counteracted, and so that a lower temperature may be used in applying the metal foil under heat and pressure to the size. In using a lowered temperature, the luster of the metal foil may be preserved in a high degree. With the cooked starch and flour, the supplemental adhesives aid in securing the size to the treated fabric. It is contemplated that the corn starch or flour, or both, whichever are used, shall have been cooked to a syrup-like consistency and then cooled to about room temperature before being added to the size.

Formulas A and B may be used as sizes in the application of metal foil by heat treatment in the well known manner to fabrics including textiles, leathers, composition materials, whether coated with starchy material and the like or impregnated with pyroxylin, varnish, lacquer, castor oil, and other oils, or the equivalent. Such fabrics are in general waterproof to varying degrees. The penetrating agent almost instantaneously dissolves the waterproofing and makes way for the egg albumen and/or supplemental adhesive, to penetrate the fabric and thus to become a part of the coated fabric. The temperature employed may be generally the same regardless of the character of the treated fabric.

It may be noted that a supplemental adhesive serves to afford a base of substantial uniformity for maximum clearness and luster in the indicia or other design effects produced with the metal foil, and permits universal use of the size with different fabrics such as are used in the book binding art.

Where the treated fabric contains a coating of starch or starchy material, acetic acid may be added to the size for the purpose of additionally aiding in the softening of such material. If, in the universal use of the size, a size containing acetic acid were applied to an impregnated lustrous fabric, the acetic acid would diminish the luster of such fabric. Hence ammonia water may be added to the size to counteract this effect of the acetic acid. The reason for this result is not understood, and it may be that some salt is produced which causes the result.

To aid in softening impregnated fabrics, and to retard drying of the size, ethylene or diethylene glycol or similar glycol may be used. Hence the best results in a universal size may be obtained by using both the acetic acid and the glycol therein. Since ethylene glycol is a solvent, it permits the use of a lesser quantity of amyl acetate, which is the most desirable solvent, but is very powerful and hence may sometimes damage certain fabrics.

It may be noted that a substance such as glucose may remain sticky for a long time, especially in humid weather, rendering it sometimes difficult on certain materials to clean off surplus metal foil. Hence it may be desirable in certain cases to use starch together with a substance such as glucose to avoid such result, since starch permits a reduction in the amount of glucose used in the size.

Although the invention is properly broadly stated in its essential principles in formulas A and B, I prefer to state the following possible formulas as more definite illustrations of embodiments of my invention. In these formulas all the numerals except as otherwise indicated refer to proportions by volume. The approximate lower and upper ranges are given, separated by a dash mark. In parentheses are given the approximate maximum upper limits which in the case of amyl acetate represents an upper limit good only for excessively impregnated fabrics, and in the case of the other ingredients indicates the range available for starch coated fabrics. It may be noted that, in interpreting the formulas, the amount of egg albumen to be used varies, in general, inversely with the amount of glucose or other supplemental adhesive; but, on the other hand, when the quantity of the penetrating agent is increased, the amount of water used should be increased likewise. Further, it is to be observed that on increasing the egg albumen, the amount of penetrating agent, other than amyl acetate, is to be in general diminished unless the quantity of water used is suitably increased.

*Formula I*

Egg albumen_____ 4–15 (20)
Water _____ 35–70
Penetrating agent_____ 4–14 (30)

Formula II

| | |
|---|---|
| Egg albumen | 3–14 (16) |
| Supplemental adhesive | 3–12 (14) |
| Water | 35–80 |
| Penetrating agent | 4–14 (30) |

Formula III

| | |
|---|---|
| Egg albumen | 4–12 (15) |
| Glucose | 3–10 (13) |
| Starch | 1– 5 |
| Water | 35–85 |
| Penetrating agent | 4–14 (30) |

Formula IV

| | |
|---|---|
| Egg albumen | 4–13 (16) |
| Glucose | 3–10 (13) |
| Starch | 1– 5 |
| Water | 35–85 |
| Penetrating agent | 4–14 (30) |
| Ethylene glycol | 1–10 |

Formula V

| | |
|---|---|
| Egg albumen | 4–13 (16) |
| Glucose | 3–10 (13) |
| Starch | 1– 5 |
| Water | 35–85 |
| Penetrating agent | 4–14 (30) |
| Acetic acid, 28% | 1– 8 (16) |
| Ammonia water, 26% | 1– 8 (16) |

Formula VI

| | |
|---|---|
| Egg albumen | 3–12 (16) |
| Glucose | 3– 9 (12) |
| Amyl acetate | 3–16 (30) |
| Acetic acid, 28% | 1– 8 (16) |
| Ammonia water, 26% | 1– 8 (16) |
| Ethylene glycol | 1–10 |
| Ethyl acetate | 1– 6 |
| Acetone | 1– 6 |
| Alcohol | 1– 8 |
| Flour | 1– 2 |
| Cornstarch | 1– 6 |
| Water | 40–90 |

Formula VII

| | |
|---|---|
| Egg albumen | 18 |
| Glucose | 8 |
| Amyl acetate | 16 |
| Acetic acid, 28% | 4 |
| Ammonia water, 26% | 4 |
| Ethylene glycol | 2 |
| Ethyl acetate | 6 |
| Acetone | 3 |
| Alcohol | 5 |
| Flour | 1 |
| Corn starch | 2 |
| Water | 45–50 |

Formula VII may be used with a variation of approximately five (5%) per cent in increasing or diminishing the amount of each or any of the ingredients therein mentioned.

In general, the successive formulas represent sizes of improved quality, the last, Formula VII, representing the best size known to me for substantially universal use on all exterior fabrics such as are used in the bookbinder's art.

Although the supplemental adhesive may include various substances which have been previously referred to as equivalents, they possess certain differences which are material in an ideal size. For example, corn starch becomes too hard when dry, whereas flour stays soft, and both of these are different from glucose which is a superior adhesive but becomes tacky in humid weather. Glucose prevents undue hardening of the egg albumen. Hence the best supplemental adhesive will contain all three of these substances. Likewise, in respect to the penetrating agent, certain solvents have been mentioned, but these have different characteristics. For instance, acetone, ethyl acetate and alcohol have a tendency to cause burning of egg albumen, a characteristic that is substantially absent in amyl acetate, but the latter sometimes damages certain kinds of coated fabrics. I have found that the ideal penetrating agent includes all of these solvents, because for some obscure reason, there is less tendency to burn the egg albumen if several different solvents are used.

Although I have stated numerous formulas giving the percentages of the ingredients thereof, I consider that my invention is sufficiently definitely expressed by Formulas A and B so as to clearly point out the invention in accordance with the requirements of the patent statutes. Hence I do not desire to be limited to any percentages of ingredients used, since it may perhaps be possible for any one skilled in the art, and having Formulas A and B, to devise certain suitable percentages.

I claim:

1. An aqueous sizing compound for the application of metal foil under heat and pressure to fabrics having moisture proof coatings, including egg albumen sufficient in amount to adhesively retain the metal foil, water for dissolving the egg albumen, and a liquid, volatile, organic solvent, adapted to be nonreactive with egg albumen in water solution and capable of acting as a penetrating agent for dissolving or softening one of a group of coatings consisting of varnish, lacquer and pyroxylin moisture proof coatings as the sizing compound is applied thereto.

2. An aqueous sizing compound for the application of metal foil under heat and pressure to fabrics having moisture proof coatings, including egg albumen sufficient in amount to adhesively retain the metal foil, water for dissolving the egg albumen, and a liquid, volatile, organic solvent, relatively nonreactive with egg albumen in water solution and capable of acting as a penetrating agent for dissolving or softening pyroxylin moisture proof coatings as the sizing compound is applied thereto.

3. An aqueous sizing compound for the application of metal foil under heat and pressure to fabrics having moisture proof coatings, including egg albumen sufficient in amount to adhesively retain the metal foil, water for dissolving the egg albumen, and amyl acetate in an amount sufficient to soften one of a group of coatings consisting of varnish, lacquer and pyroxylin moisture proof coatings, substantially as the sizing compound is applied thereto.

4. An aqueous sizing compound for the application of metal foil under heat and pressure to fabrics having moisture proof coatings, including, in parts by volume,

| | |
|---|---|
| Egg albumen | 4–15 |
| Water | 35–70 |
| Penetrating agent | 4–14 | the penetrating agent being a liquid, volatile, organic solvent, adapted to be non-reactive with egg albumen in water solution, and capable of softening one of a group of coatings consisting of varnish, lacquer and pyroxylin moisture proof coatings, substantially as the compound is applied thereto.

5. An aqueous sizing compound for the application of metal foil under heat and pressure to fabrics having moisture proof coatings, including egg albumen sufficient in amount to adhesively retain the metal foil, water for dissolving the egg albumen, glucose for preventing the egg albumen from drying too hard and causing discoloration thereby, and a liquid volatile, organic solvent, adapted to be nonreactive with egg albumen in water solution, and capable of softening one of a group of coatings consisting of varnish, lacquer and pyroxylin moisture proof coatings, as the sizing compound is applied thereto.

6. An aqueous sizing compound for the application of metal foil under heat and pressure to fabrics having moisture proof coatings, including egg albumen sufficient in amount to adhesively retain the metal foil, water for dissolving the egg albumen, glucose for preventing discoloration of the egg albumen by excessive hardening, a carbohydrate adhesive for reducing tackiness of the glucose, and a liquid, volatile, organic solvent, adapted to be nonreactive with egg albumen in water solution and capable of softening one of a group of coatings consisting of varnish, lacquer and pyroxylin moisture proof coatings, as the sizing compound is applied thereto.

7. An aqueous size for the application of metal foil under heat and pressure to fabrics having moisture proof coatings, including egg albumen sufficient in amount to adhesively retain the metal foil, water for dissolving the egg albumen, and a penetrating solvent for said coatings, of the group consisting of amyl acetate, ethyl acetate, acetone, and ethyl and methyl alcohol, for dissolving or softening said coatings as the size is applied thereto.

GEORGE P. JOHNSON.